US011645146B2

(12) United States Patent
Safary et al.

(10) Patent No.: US 11,645,146 B2
(45) Date of Patent: *May 9, 2023

(54) AUTOMATED SYSTEM FOR INTELLIGENT ERROR CORRECTION WITHIN AN ELECTRONIC BLOCKCHAIN LEDGER

(71) Applicant: BANK OF AMERICA CORPORATION, Charlotte, NC (US)

(72) Inventors: Jigesh Rajendra Safary, Mumbai (IN); Krishna R. Mamadapur, Pune (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/483,039

(22) Filed: Sep. 23, 2021

(65) Prior Publication Data
US 2022/0012120 A1 Jan. 13, 2022

Related U.S. Application Data

(63) Continuation of application No. 16/395,854, filed on Apr. 26, 2019, now Pat. No. 11,150,978.

(51) Int. Cl.
G06F 11/00 (2006.01)
G06F 11/07 (2006.01)
(Continued)

(52) U.S. Cl.
CPC ...... G06F 11/0793 (2013.01); G06F 11/0709 (2013.01); G06F 11/079 (2013.01);
(Continued)

(58) Field of Classification Search
CPC ............. G06F 11/0751; G06F 11/0766; G06F 11/0769; G06F 11/0775; G06F 11/079;
(Continued)

(56) References Cited

U.S. PATENT DOCUMENTS 10,275,176 B1  4/2019  Gold et al.
10,289,509 B2* 5/2019  Xu ....................... G06N 3/0445
(Continued)

OTHER PUBLICATIONS

Li, Jiao, Data Transmission Scheme Considering Node Failure for Blockchain, Feb. 6, 2018, Springer Science + Business Media (Year: 2018).*

Primary Examiner — Marc Duncan
(74) Attorney, Agent, or Firm — Moore & Van Allen PLLC; Seongun M. Hong

(57) ABSTRACT

A system for automated and intelligent error correction within an electronic blockchain ledger is provided. The system may analyze unformatted/unstructured blockchain event logs using machine learning algorithms in order to identify and label the errors within the event logs. Based on the identified errors, the system may use predictive analysis in conjunction with error or rule repositories and/or machine learning to identify potential solutions to the identified errors. Once the potential solutions have been identified, the system may automatically attempt to rectify the blockchain transaction errors using the potential solutions. The system may further comprise trend/correlation analyses and reporting functions regarding various metrics and may output said metrics in various accessible formats.

18 Claims, 4 Drawing Sheets

(51) Int. Cl.
    *G06N 3/08*     (2023.01)
    *G06F 16/23*     (2019.01)
    *G06F 11/22*     (2006.01)

(52) U.S. Cl.
    CPC ...... *G06F 11/0751* (2013.01); *G06F 11/0775* (2013.01); *G06F 11/2252* (2013.01); *G06F 11/2257* (2013.01); *G06F 11/2263* (2013.01); *G06F 16/2358* (2019.01); *G06N 3/08* (2013.01)

(58) Field of Classification Search
    CPC ............ G06F 11/0793; G06F 11/2252; G06F 11/2257; G06F 11/2263; G06F 11/3072; G06F 11/3068
    See application file for complete search history.

(56) References Cited

U.S. PATENT DOCUMENTS

| | | | |
|---|---|---|---|
| 10,289,816 | B1 | 5/2019 | Malassenet |
| 10,291,413 | B2 | 5/2019 | Ramathal |
| 10,296,248 | B2 | 5/2019 | Ateniese et al. |
| 10,348,707 | B2 | 7/2019 | Ateniese |
| 10,565,077 | B2 * | 2/2020 | Hayden ............... G06F 11/2257 |
| 10,649,882 | B2 * | 5/2020 | Li ......................... G06N 3/0445 |
| 10,789,597 | B2 | 9/2020 | Brashers |
| 10,896,195 | B2 | 1/2021 | Sato et al. |
| 10,938,567 | B2 | 3/2021 | Martino et al. |
| 11,032,293 | B2 | 6/2021 | Biyani et al. |
| 11,068,389 | B2 | 7/2021 | Gao et al. |
| 11,196,551 | B2 | 12/2021 | Weldemariam et al. |
| 2017/0243193 | A1 | 8/2017 | Manian et al. |
| 2018/0082296 | A1 | 3/2018 | Brashers |
| 2018/0113773 | A1 * | 4/2018 | Krishnan ............... G06N 20/20 |
| 2018/0157700 | A1 | 6/2018 | Roberts |
| 2018/0276626 | A1 | 9/2018 | Laiben |
| 2018/0287797 | A1 | 10/2018 | Banerjee |
| 2018/0309581 | A1 | 10/2018 | Butler |
| 2018/0315055 | A1 | 11/2018 | Pickover |
| 2019/0014116 | A1 | 1/2019 | Khi |
| 2019/0018984 | A1 | 1/2019 | Setty |
| 2019/0036895 | A1 | 1/2019 | Irvine |
| 2019/0044703 | A1 | 2/2019 | Smith |
| 2019/0050855 | A1 | 2/2019 | Martino et al. |
| 2019/0058910 | A1 | 2/2019 | Solow |
| 2019/0079952 | A1 | 3/2019 | Klarman |
| 2019/0079998 | A1 | 3/2019 | Rush |
| 2019/0095313 | A1 * | 3/2019 | Xu ....................... G06F 11/008 |
| 2019/0122317 | A1 | 4/2019 | Hunn et al. |
| 2019/0146946 | A1 | 5/2019 | Zhang |
| 2019/0163553 | A1 * | 5/2019 | Ramegowda ....... G06F 16/3344 |
| 2019/0164220 | A1 | 5/2019 | Raj |
| 2019/0171365 | A1 | 6/2019 | Power |
| 2019/0207768 | A1 | 7/2019 | Hardy |
| 2019/0208422 | A1 | 7/2019 | Haleem |
| 2019/0236598 | A1 | 8/2019 | Padmanabhan |
| 2019/0236606 | A1 | 8/2019 | Padmanabhan et al. |
| 2019/0238316 | A1 | 8/2019 | Padmanabhan |
| 2019/0251279 | A1 | 8/2019 | Emberson |
| 2019/0286373 | A1 | 9/2019 | Karumbunathan |
| 2019/0347148 | A1 * | 11/2019 | Gomes Pereira ... G06F 11/3466 |
| 2019/0379699 | A1 | 12/2019 | Katragadda et al. |
| 2019/0386969 | A1 | 12/2019 | Verzun et al. |
| 2020/0081648 | A1 | 3/2020 | Bernat et al. |
| 2020/0118068 | A1 | 4/2020 | Turetsky et al. |
| 2020/0174463 | A1 | 6/2020 | Cella et al. |
| 2021/0160233 | A1 | 5/2021 | Biyani et al. |

* cited by examiner

AUTOMATED SYSTEM FOR INTELLIGENT ERROR CORRECTION WITHIN AN ELECTRONIC BLOCKCHAIN LEDGER

CROSS-REFERENCE TO RELATED APPLICATION

The present application is a continuation of co-pending U.S. patent application Ser. No. 16/395,854, of the same title and filed on Apr. 26, 2019, which is assigned to the assignee hereof and the contents thereof are hereby expressly incorporated by reference herein.

FIELD OF THE INVENTION

The present disclosure embraces a system for automated and intelligent error correction within an electronic blockchain ledger. In particular, the system may use machine learning Natural Language Processing (NLP) algorithms to analyze unstructured blockchain event logs and use predictive analysis models to automatically correct blockchain transaction errors.

BACKGROUND

Computing systems implementing a blockchain ledger may generate event logs in response to encountering a processing error. Conventional error correction methods may pose a number of technological challenges in that the event logs may be unstructured and not be readily usable to rectify the errors. Accordingly, there is a need for a more efficient way to read and understand the unformatted/unstructured error logs to provide error correction processes in a blockchain ledger.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for automated and intelligent error correction within an electronic blockchain ledger. The system may analyze unformatted/unstructured blockchain event logs using machine learning algorithms in order to identify and label the errors within the event logs. Based on the identified errors, the system may use predictive analysis in conjunction with error or rule repositories and/or machine learning to identify potential solutions to the identified errors. Once the potential solutions have been identified, the system may automatically attempt to rectify the blockchain transaction errors using the potential solutions. The system may further comprise trend/correlation analyses and reporting functions regarding various metrics and may output said metrics in various accessible formats.

Accordingly, embodiments of the present disclosure provide a system for automatic error correction within a blockchain ledger system. The system may comprise a memory device with computer-readable program code stored thereon; a communication device; and a processing device operatively coupled to the memory device and the communication device. The processing device may be configured to execute the computer-readable program code to receive, from the blockchain ledger, a blockchain event log, wherein the blockchain event log comprises a blockchain error; identify the blockchain error from the blockchain event log; based on identifying the blockchain error, perform predictive error analysis of the blockchain error; and based on the predictive error analysis, perform automatic error correction of a process flow of the blockchain ledger system.

In some embodiments, identifying the blockchain error from the blockchain event log comprises performing text analysis of the blockchain event log, wherein the text analysis comprises extracting text associated with the blockchain error from the blockchain event log.

In some embodiments, identifying the blockchain error from the blockchain event log comprises performing machine learning analysis of the blockchain event log via a deep neural network algorithm.

In some embodiments, performing the predictive error analysis of the blockchain error comprises analyzing a blockchain error using an error repository; and detecting a match between the blockchain error and a corresponding entry within the error repository, wherein the corresponding entry comprises error resolution code, wherein performing automatic error correction of the process flow comprises executing the error resolution code.

In some embodiments, performing the predictive error analysis of the blockchain error comprises detecting an error component from the blockchain error via a text analysis algorithm; and based on detecting the error component, determining a set of solution rules, wherein performing automatic error correction of the process flow comprises executing the set of solution rules.

In some embodiments, performing the predictive error analysis of the blockchain error comprises detecting an error component from the blockchain error via a machine learning algorithm; and based on detecting the error component, determining a set of solution rules, wherein performing automatic error correction of the process flow comprises executing the set of solution rules.

In some embodiments, the computer-readable program code further causes the processing device to generate an error report based on the predictive error analysis, wherein the error report comprises one of error frequency, error classification, or error source.

In some embodiments, the computer-readable program code further causes the processing device to perform correlation analysis between the blockchain error and the process flow of the blockchain ledger system.

In some embodiments, the blockchain error is a connection failure error.

Embodiments of the present disclosure further provide a computer program product for automatic error correction within a blockchain ledger system. The computer program product may comprise at least one non-transitory computer readable medium having computer-readable program code portions embodied therein. The computer-readable program code portions may comprise executable code portions for receiving, from the blockchain ledger, a blockchain event log, wherein the blockchain event log comprises a blockchain error; identifying the blockchain error from the blockchain event log; based on identifying the blockchain error, performing predictive error analysis of the blockchain error; and based on the predictive error analysis, performing automatic error correction of a process flow of the blockchain ledger system.

In some embodiments, identifying the blockchain error from the blockchain event log comprises performing text analysis of the blockchain event log, wherein the text analysis comprises extracting text associated with the blockchain error from the blockchain event log.

In some embodiments, identifying the blockchain error from the blockchain event log comprises performing machine learning analysis of the blockchain event log via a deep neural network algorithm.

In some embodiments, performing the predictive error analysis of the blockchain error comprises analyzing a blockchain error using an error repository; and detecting a match between the blockchain error and a corresponding entry within the error repository, wherein the corresponding entry comprises error resolution code, wherein performing automatic error correction of the process flow comprises executing the error resolution code.

In some embodiments, performing the predictive error analysis of the blockchain error comprises detecting an error component from the blockchain error via a text analysis algorithm; and based on detecting the error component, determining a set of solution rules, wherein performing automatic error correction of the process flow comprises executing the set of solution rules.

In some embodiments, performing the predictive error analysis of the blockchain error comprises detecting an error component from the blockchain error via a machine learning algorithm; and based on detecting the error component, determining a set of solution rules, wherein performing automatic error correction of the process flow comprises executing the set of solution rules.

Embodiments of the present disclosure further provide a computer-implemented method for automatic error correction within a blockchain ledger system. The method may comprise receiving, from the blockchain ledger, a blockchain event log, wherein the blockchain event log comprises a blockchain error; identifying the blockchain error from the blockchain event log; based on identifying the blockchain error, performing predictive error analysis of the blockchain error; and based on the predictive error analysis, performing automatic error correction of a process flow of the blockchain ledger system.

In some embodiments, identifying the blockchain error from the blockchain event log comprises performing text analysis of the blockchain event log, wherein the text analysis comprises extracting text associated with the blockchain error from the blockchain event log.

In some embodiments, identifying the blockchain error from the blockchain event log comprises performing machine learning analysis of the blockchain event log via a deep neural network algorithm.

In some embodiments, performing the predictive error analysis of the blockchain error comprises analyzing a blockchain error using an error repository; and detecting a match between the blockchain error and a corresponding entry within the error repository, wherein the corresponding entry comprises error resolution code, wherein performing automatic error correction of the process flow comprises executing the error resolution code.

In some embodiments, performing the predictive error analysis of the blockchain error comprises detecting an error component from the blockchain error via a text analysis Natural Language Processing (NLP) algorithm, and based on detecting the error component, determining a set of solution rules, wherein performing automatic error correction of the process flow comprises executing the set of solution rules.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
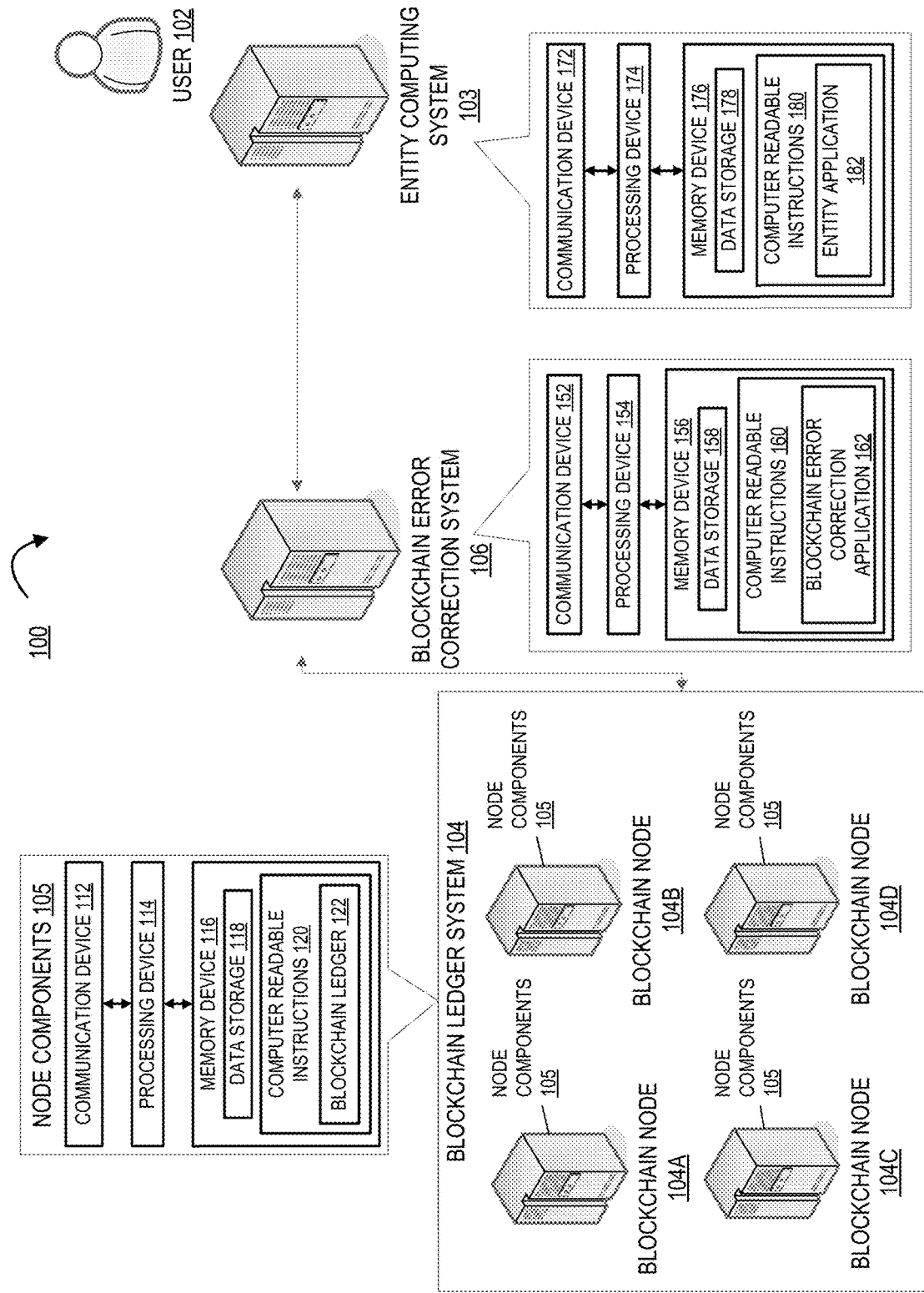
Figure 2:
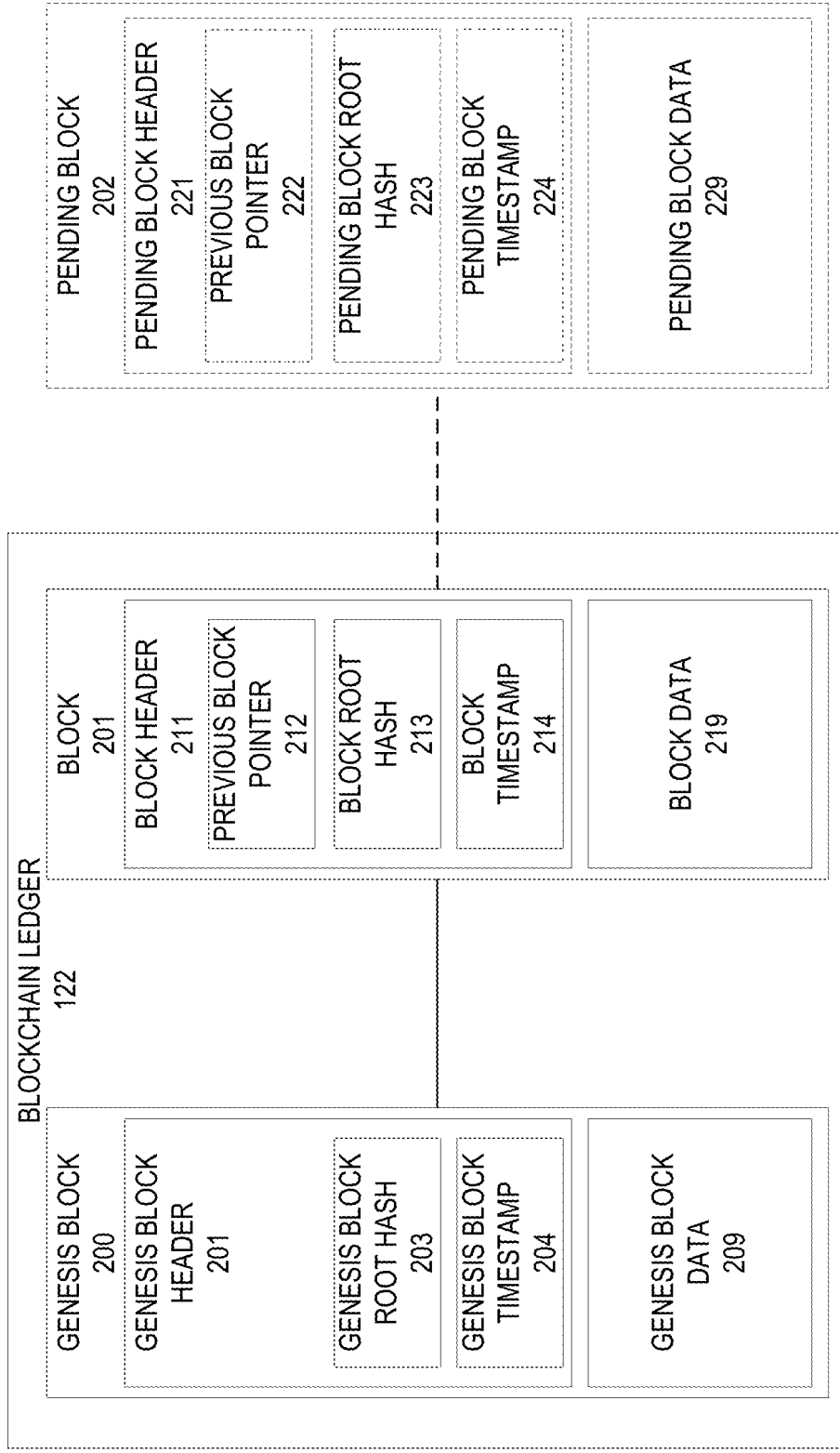
Figure 3:
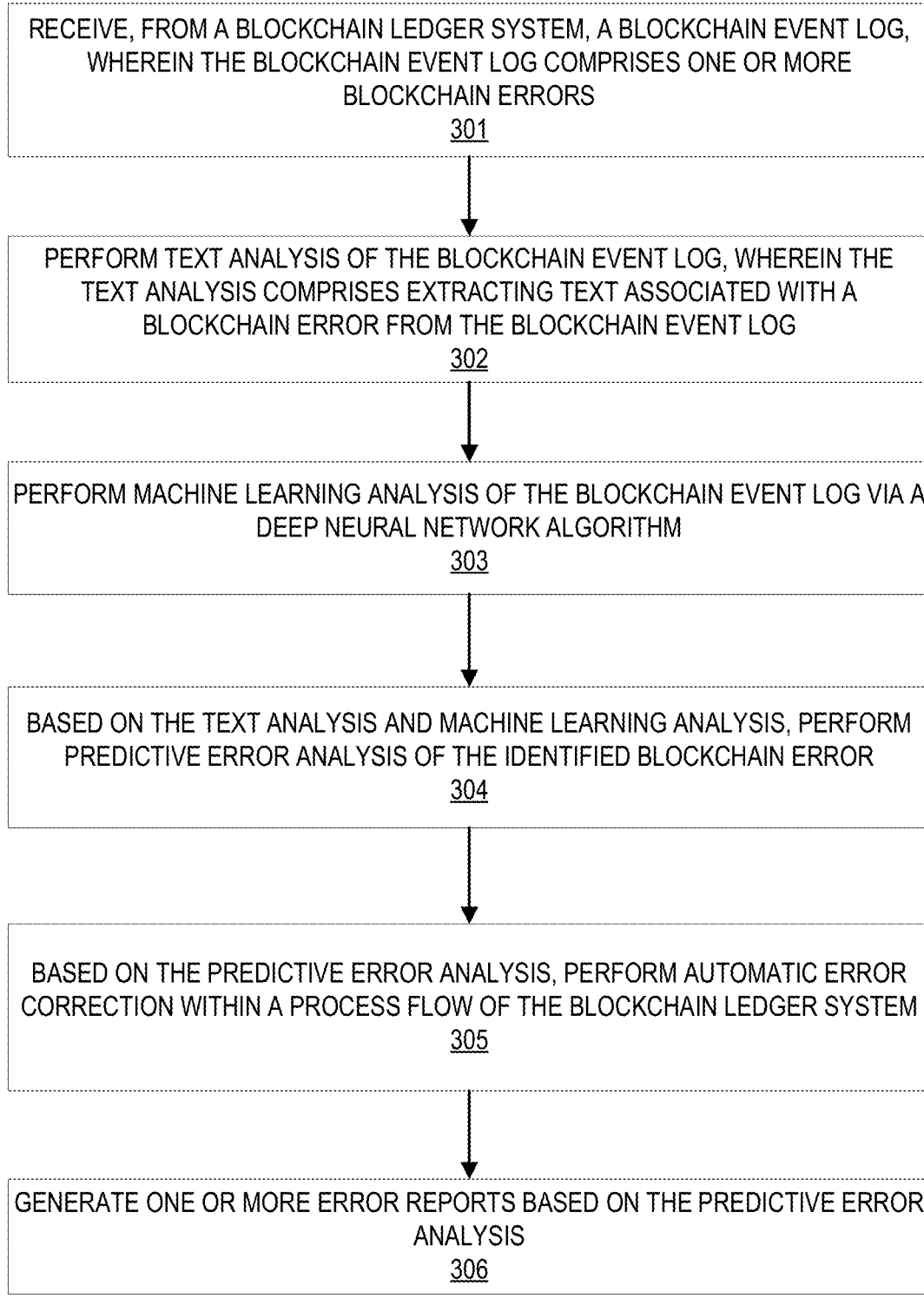
Figure 4:
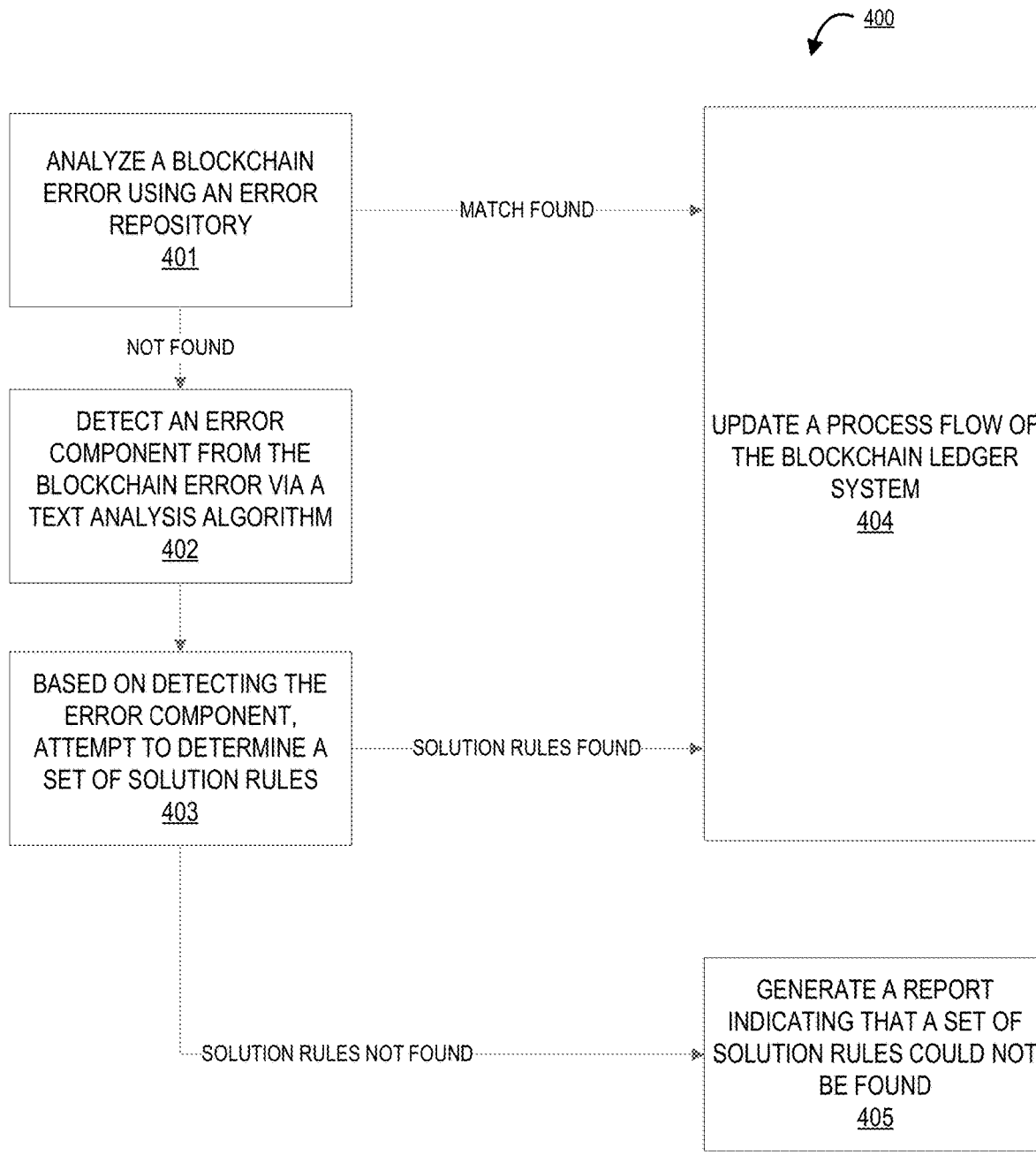

Having thus described embodiments of the invention in general terms, reference will now be made to the accompanying drawings, wherein:

FIG. 1 illustrates an operating environment for the blockchain error correction system, in accordance with one embodiment of the present disclosure;

FIG. 2 is a block diagram illustrating the data structures within an exemplary blockchain ledger, in accordance with one embodiment of the present disclosure;

FIG. 3 illustrates a process flow for the blockchain error correction system, in accordance with one embodiments of the present disclosure; and FIG. 4 illustrates a process flow for performing automatic resolution of blockchain errors.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" or "data quality system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Neural network" as referred to herein may refer to a network of computing nodes that use machine learning algorithms to accomplish certain tasks. Broadly, neural networks may be used for tasks requiring pattern recognition. For instance, a neural network may be constructed and used for the purposes of speech recognition, facial recognition, detection of unauthorized activity, machine translation, AI, or the like.

"Distributed ledger" or "distributed electronic ledger" as used herein may refer to a structured list of data records that is decentralized and distributed amongst a plurality of computing systems and/or devices. In some embodiments, the distributed ledger may be a blockchain ledger.

"Blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the blockchain. In this way, beginning from an originating block (e.g., a "genesis block"), each block in the blockchain is linked to another block via the pointers within the block headers. If the data or metadata within a particular block in the blockchain becomes corrupted or modified, the hash values found in the header of the affected block and/or the downstream blocks may become mismatched, thus allowing the system to detect that the data has been corrupted or modified.

A "blockchain ledger" may refer to a distributed ledger which uses blockchain data structures. Generally, a blockchain ledger is an "append only" ledger in which the data within each block within the blockchain may not be modified after the block is added to the blockchain; data may only be added in a new block to the end of the blockchain. In this way, the blockchain may provide a practically immutable ledger of data records over time.

"Permissioned blockchain" as used herein may refer to a blockchain ledger for which an access control mechanism is implemented such that only known, authorized users may take certain actions with respect to the blockchain ledger (e.g., add new data records, participate in the consensus mechanism, or the like). Accordingly, "unpermissioned blockchain" as used herein may refer to a blockchain ledger without an access control mechanism.

"Private blockchain" as used herein may refer to a blockchain ledger accessible only to users or devices that meet specific criteria (e.g., authorized users or devices of a certain entity or other organization). Accordingly, a "public blockchain" is a blockchain ledger accessible by any member or device in the public realm.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid blockchain such that certain nodes may store certain segments of the blockchain but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

Embodiments of the present disclosure provide a system for intelligent error correction within a blockchain ledger. The system may continuously monitor event logs generated by a blockchain ledger and analyze the event logs using machine learning algorithms. Typically, the event logs are received by the system as unstructured data. In this regard, the system may use machine learning to analyze (e.g., read, reformat, clean, or otherwise transform) the unstructured event logs and identify, categorize, and label errors (or exceptions) within the event log. The system may further identify the issue which caused each error and use predictive analysis to determine whether the underlying issues may be corrected. In particular, the results of the analysis may include 1) the most numerous categories of error; 2) the source and underlying issues causing the greatest number of errors; 3) tasks that require the most processing time; 4) trend/correlation analysis between different variables, or the like.

If the system determines that the errors can be corrected, the system may automatically execute one or more processes to correct the error using the solutions identified via the analysis. In this regard, the system may determine that the process flow for the blockchain ledger should be updated to remediate the error. For instance, if a reported error is an "out of gas" error for a blockchain transaction, then the system may determine the underlying issue for the error (e.g., an inadequate gas limit). Once the underlying issue has been identified, the system may automatically modify the process flow of the blockchain (e.g., by increasing the gas limit) such that the error is automatically remediated via the modified blockchain process flow (e.g., the transaction may proceed with the increased gas limit).

In some embodiments, the system may further be configured to perform reporting functions with respect to the results of the automatic error correction processes. For instance, the system may output data regarding the performance of the error correction system (e.g., the categories of errors, recurring issues, percentage of errors automatically resolved, error correction failures, trend analysis, or the like) in various readable formats (e.g., a bar graph, pie chart, spreadsheet, or the like).

The system as described herein confers a number of technological advantages over systems which use conventional methods for error correction. In particular, the system removes inefficiencies and exceptions within the blockchain system by reformatting and conditioning the unstructured blockchain event log data for analysis and further by automatically executing error correction processes based on identified errors. Furthermore, by dynamically making adjustments to the process flow of the blockchain ledger, the system may significantly reduce the processing time of the blockchain processes as well as improve the usability and functionality of the blockchain ledger.

Turning now to the figures, FIG. 1 illustrates an operating environment 100 for the blockchain error correction system, in accordance with one embodiment of the present disclosure. In particular, FIG. 1 illustrates a blockchain error correction system 106 that is operatively coupled, via a network, to a blockchain ledger system 104 and/or an entity computing system 103, where the blockchain ledger system 104 may comprise one or more blockchain nodes 104A, 104B, 104C, 104D. In such a configuration, the blockchain error correction system 106 may transmit information to and receive information from the blockchain ledger system 104 and/or the entity computing system 103. It should be understood that FIG. 1 illustrates only an exemplary embodiment of the operating environment 100, and it will be appreciated that one or more functions of the systems, devices, or servers as depicted in FIG. 1 may be combined into a single system, device, or server. For instance, the functions of the blockchain error correction system 106 and the entity computing system 103 may be executed on a single computing system. Furthermore, a single system, device, or server as depicted in FIG. 1 may represent multiple systems, devices, or servers.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the blockchain error correction system 106 may comprise a communication device 152, a processing device 154, and a memory device 156. The blockchain error correction system 106 may be owned and/or operated by an entity such as an Internet service provider, financial institution, business organization, government agency, or the like. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 is operatively coupled to the communication device 152 and the memory device 156. The processing device 154 uses the communication device 152 to communicate with the network and other devices on the network, such as, but not limited to the blockchain node 104 and/or the entity computing system 103. The communication device 152 generally comprises a modem, antennae, WiFi or Ethernet adapter, radio transceiver, or other device for communicating with other devices on the network.

The memory device 156 may have computer-readable instructions 160 stored thereon, which in one embodiment includes the computer-readable instructions 160 of a blockchain error correction application 162 which allows the entity system to perform various functions related to event log interpreting and/or transformation processes, automatic error correction, and/or blockchain error reporting functions as described herein. In some embodiments, the memory device 156 includes data storage 158 for storing data related to the system environment, but not limited to data created and/or used by the blockchain error correction application 162. The blockchain error correction application 162 may comprise computer-executable program code which may instruct the processing device 154 to perform certain logic, data processing, and data storing functions of the application to accomplish the entity's objectives. For instance, the blockchain error correction application 162 may read event log data from the blockchain ledger system 104 and/or perform modifications to the process flow of the blockchain ledger system 104 and/or other systems within the operating environment 100.

As further illustrated in FIG. 1, the blockchain ledger system 104 may comprise a plurality of computing systems (e.g., the blockchain nodes 104A, 104B, 104C, 104D) which are owned and/or operated by the entity for the purposes of improving the quality of the input data received by the blockchain error correction system 106. In this regard, each of the blockchain nodes 104A, 104B, 104C, 104D may be, for example, a networked terminal, server, desktop computer, or the like, though it is within the scope of the disclosure for a blockchain node 104A, 104B, 104C, 104D to be a portable device such as a cellular phone, smart phone, smart device, personal data assistant (PDA), laptop, or the like. Each of the blockchain nodes 104A, 104B, 104C, 104D generally comprises a set of node components 105, which in turn comprises a communication device 112, a processing device 114, and a memory device 116, where the processing device 114 is operatively coupled to the communication device 112 and the memory device 116. The processing device 114 uses the communication device 112 to communicate with the network and other devices on the network, such as, but not limited to the blockchain error correction system 106 and/or the entity computing system 103. As such, the communication device 112 generally comprises a modem, antennae, WiFi or Ethernet adapter, radio transceiver, or other device for communicating with other devices on the network.

The memory device 116 comprises computer-readable instructions 120 and data storage 118, which in one embodiment includes the computer-readable instructions 120 of a blockchain ledger 122. The blockchain ledger 122 may comprise a series of data records relevant to the objectives of the entity. For instance, in embodiments in which the entity is a financial institution, the blockchain ledger 122 may comprise a series of transaction records. Each blockchain node 104A, 104B, 104C, 104D maintains its separate copy of the blockchain ledger 122, where the contents of each copy of the blockchain ledger 122 are determined via a consensus algorithm, as will be described further below.

The operating environment 100 may further comprise an entity computing system 103. The entity computing system 103 may refer to a computing system which may be operated by a user 102 such as an administrator or employee of the entity. The entity computing system 103 may receiving outputs (e.g., data reports, notifications, or the like) from the blockchain error correction system 106 or send inputs (e.g., changes in configuration, data requests, or the like) to the blockchain error correction system 106. The entity computing system 103 may further interact with the blockchain ledger system 104 (e.g., to make changes in workflow, send transaction and/or data record requests, receive notifications, or the like). In this regard, the entity computing system 103 may also comprise a processing device 174 operatively coupled to the communication device 172 and a memory device 176 comprising data storage 178 and computer readable instructions 180.

The computer readable instructions 180 may comprise an entity application 182 which may be configured to instruct the processing device 174 to execute certain functions over the network, such as interacting with the blockchain error correction system 106 and/or the blockchain node 104. In some embodiments, the computer readable instructions 180 may further comprise a data repository which may store look up tables, policy tables, or other reference data to be used in the data quality refinement process.

The communication device 172, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the entity computing system 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user 102, may include any of a number of devices allowing the devices to receive data from a user 102, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 is a block diagram illustrating the data structures within an exemplary blockchain ledger 122, in accordance with some embodiments. In particular, FIG. 2 depicts a plurality of blocks 200, 201 within the blockchain ledger 122, in addition to a proposed block 302 that has been submitted to be appended to the blockchain ledger 122. The blockchain ledger 122 may comprise a genesis block 200 that serves as the first block and origin for subsequent blocks in the blockchain ledger 122. The genesis block 200, like all other blocks within the blockchain ledger 122, comprise a block header 201 and block data 209. The genesis block data 209, or any other instances of block data any blocks in the blockchain ledger 122 may contain various data records. For instance, block data may comprise authentication data, transaction data, documents or other data containers, third party information, regulatory and/or legal data, or the like.

The genesis block header 201 may comprise various types of metadata regarding the genesis block data 209. In some embodiments, the block header 610 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the blockchain ledger 122. In some embodiments, the timestamp may be a Unix timestamp. In some embodiments, particularly in blockchains utilizing a PoW consensus mechanism, the block header 201 may comprise a nonce value and a difficulty value. The nonce value may be a whole number value that, when combined with a hash of the other items of metadata within the block header 201, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the blockchain. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (i.e., the genesis block 200) in the blockchain ledger 122, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the blockchain to pass the validation checks imposed by the consensus algorithm. Thus, the computational impracticability of altering data records in a blockchain in turn greatly reduces the chance of improper alteration of data records.

A pending block 202 or "proposed block" may be submitted for addition to the blockchain ledger 122. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the blockchain, produces a hash value that falls under a specified threshold value. For instance, the PoW algorithm may require that said hash value begins with a certain number of zeroes. Once said nonce value is determined by one of the nodes in the blockchain, the node may post the "solution" to the other nodes in the blockchain. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the blockchain ledger 122. A pending block timestamp 224 may also be added to signify the time at which the pending block 202 is added to the blockchain ledger 122. In other embodiments, the consensus mechanism may be based on a total number of consensus inputs submitted by the nodes of the blockchain ledger 122, e.g., a PBFT consensus mechanism. Once a threshold number of consensus inputs to validate the pending block 202 has been reached, the pending block 202 may be appended to the blockchain ledger 122. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block.

FIG. 3 illustrates a process flow 300 for the blockchain error correction system. The process begins at block 301, where the system receives, from a blockchain ledger system, a blockchain event log, wherein the blockchain event log comprises one or more blockchain errors. The system may continuously monitor event logs from the blockchain ledger system in real-time. Typically, the blockchain event logs generated by the blockchain ledger system exist as unstructured, unformatted data. The event logs may contain error information about one or more errors encountered by the blockchain ledger system. For instance, the event log may contain an "out of gas" error which may have caused a transaction to fail or a "connection failed" error. Accordingly, the system may perform various functions on the unstructured data to extract error information automatically, as described in further detail below.

The process continues to block 302, where the system performs text analysis of the blockchain event log, wherein the text analysis comprises extracting text associated with a blockchain error from the blockchain event log. The system may use, for example, a natural language toolkit, a Naïve Bayes text classifier, or the like to extract text in a format that is readable by the system. For instance, the text analysis may comprise detecting a string of characters that contain "connectionfailed" and determining that the event log contains a connection failure error. The system may further extract information related to the connection failure (e.g., the cause of the connection failure, such as a response timeout).

The process continues to block 303, where the system performs machine learning analysis of the blockchain event log via a deep neural network algorithm. In some embodiments, this step may be performed in parallel to or in conjunction with step 302 above. In this regard, the system may use a neural network algorithm to correlate certain characters and/or strings found in the event log with certain blockchain errors. In this way, over time, the system may adaptively recognize blockchain errors which are not explicitly defined in a repository. Once the errors are recognized using the neural network algorithm, the system may extract the identified errors from the blockchain event log and transform the error data into a recognizable format (e.g., for reporting or further processing by the system).

The process continues to block 304, where the system, based on the text analysis and machine learning analysis, performs predictive error analysis of the blockchain error. In particular, the system may predict whether the blockchain error may be automatically corrected based on a number of factors as determined through the analysis. For instance, the predictive error analysis may reach a decision based on the source of the blockchain error, the frequency of the particular blockchain error, the classification of blockchain error, or the like. The system may further perform a comparative analysis of various factors to determine metrics such as the greatest frequency of certain error classifications, the blockchain errors that take the most time to resolve, the effect of the errors on the blockchain process flow, and other types of trends and/or correlations.

The process continues to block 305, where the system, based on the predictive error analysis, performs automatic error correction within a process flow of the blockchain ledger system. In particular, the system may identify potential solutions to the blockchain error for automatic resolution, as will be further described below. For instance, an "out of gas" error may be automatically resolved by executing processes such as increasing the gas supply or increasing the gas limit. In this way, the system may minimize the impact of the blockchain errors on the process flow of the blockchain ledger system.

The process concludes at block 306, where the system generates one or more error reports based on the predictive error analysis. The system may output the results of the predictive error analysis and/or the automatic error correction attempt in a variety of formats which may be used by a user (e.g., an administrator of the entity). For instance, the system may output the metrics identified via the text analysis, machine learning analysis, and/or the predictive error analysis (e.g., classifications, frequency, or resolutions of errors, or other metrics) as charts, graphs, spreadsheets, formatted text documents, or the like.

FIG. 4 illustrates a process flow 400 for performing automatic resolution of blockchain errors, in accordance with one embodiment of the present disclosure. The process begins at block 401, where the system analyzes a blockchain error using an error repository. In particular, the system may comprise a data repository of known blockchain errors. Said data repository may further comprise information regarding known solutions to specific blockchain errors (e.g., executable code to automatically resolve the error). Accordingly, the system may attempt to match the identified blockchain error with a corresponding entry within the error repository. If a match is found, the process may proceed to block 404, where the system updates a process flow of the blockchain ledger system. In such embodiments, the system may update the process flow by executing the solution to the blockchain error as found within the error repository.

If a match is not found within the error repository, the process continues to block 402, where the system detects an error component from the blockchain error via a text analysis algorithm. In particular, the system may use text analysis to extract certain key words or characters which relate to errors (e.g., a "connection" and/or "failed" may be extracted and correlated to a "connection failed" error).

Once an error has been identified via the text analysis, the process continues to block 403, where the system, based on detecting the error component, attempts to determine a set of solutions rules. Said rules may be found, for instance, within an error and/or solutions rules repository. In other embodiments, solutions may be generated using machine learning algorithms over time. If suitable solution rules are found, then the process continues to block 404, where the system updates the process flow of the blockchain ledger system using the determined solution rules.

If the solution rules are not found, the process continues to block 405, where the system generates a report indicating that a set of solution rules could not be found. In this way, the system may automatically correct blockchain errors to the greatest extent possible, which in turn minimizes the inefficiencies of the blockchain ledger system in executing its processes.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for automatic error correction within a blockchain ledger system, the system comprising:
    a memory device with computer-readable program code stored thereon;
    a communication device; and
    a processing device operatively coupled to the memory device and the communication device, wherein the processing device is configured to execute the computer-readable program code to:
        receive, from the blockchain ledger system, a blockchain event log, wherein the blockchain event log comprises a blockchain error;
        identify the blockchain error from the blockchain event log;
        based on identifying the blockchain error, perform predictive error analysis of the blockchain error;
        based on the predictive error analysis, perform automatic error correction of a process flow of the blockchain ledger system;
        perform comparative analysis between the blockchain error and the process flow of the blockchain ledger system, wherein performing comparative analysis comprising determining metrics related to: a frequency of certain error classifications, blockchain errors that require extended time to resolve, effects of an error on the blockchain process flow, and error trends; and
        generate one or more error reports, the one or more error reports comprises a result of the automatic error correction of the process flow and the metrics determined by the comparative analysis.

2. The system according to claim 1, wherein identifying the blockchain error from the blockchain event log comprises performing text analysis of the blockchain event log, wherein the text analysis comprises extracting text associated with the blockchain error from the blockchain event log.

3. The system according to claim 1, wherein identifying the blockchain error from the blockchain event log comprises performing machine learning analysis of the blockchain event log via a deep neural network algorithm.

4. The system according to claim 1, wherein performing the predictive error analysis of the blockchain error comprises:
    analyzing a blockchain error using an error repository; and
    detecting a match between the blockchain error and a corresponding entry within the error repository, wherein the corresponding entry comprises error resolution code, wherein performing automatic error correction of the process flow comprises executing the error resolution code.

5. The system according to claim 1, wherein performing the predictive error analysis of the blockchain error comprises:
    detecting an error component from the blockchain error via a text analysis algorithm; and
    based on detecting the error component, determining a set of solution rules, wherein performing automatic error correction of the process flow comprises executing the set of solution rules.

6. The system according to claim 1, wherein performing the predictive error analysis of the blockchain error comprises:
    detecting an error component from the blockchain error via a machine learning algorithm; and
    based on detecting the error component, determining a set of solution rules, wherein performing automatic error correction of the process flow comprises executing the set of solution rules.

7. The system according to claim 1, wherein the blockchain error is a connection failure error.

8. A computer program product for automatic error correction within a blockchain ledger system, the computer program product comprising at least one non-transitory computer readable medium having computer-readable program code portions embodied therein, the computer-readable program code portions comprising executable code portions for:
    receiving, from the blockchain ledger system, a blockchain event log, wherein the blockchain event log comprises a blockchain error;
    identifying the blockchain error from the blockchain event log;
    based on identifying the blockchain error, performing predictive error analysis of the blockchain error;
    based on the predictive error analysis, performing automatic error correction of a process flow of the blockchain ledger system;
    performing comparative analysis between the blockchain error and the process flow of the blockchain ledger system, wherein performing comparative analysis comprises determining metrics related to: a frequency of certain error classifications, blockchain errors that require extended time to resolve, effects of an error on the blockchain process flow, and error trends; and generating one or more error reports, the one or more error reports comprising a result of the automatic error correction of the process flow and the metrics determined by the comparative analysis.

9. The computer program product of claim 8, wherein identifying the blockchain error from the blockchain event log comprises performing text analysis of the blockchain event log, wherein the text analysis comprises extracting text associated with the blockchain error from the blockchain event log.

10. The computer program product of claim 8, wherein identifying the blockchain error from the blockchain event log comprises performing machine learning analysis of the blockchain event log via a deep neural network algorithm.

11. The computer program product of claim 8, wherein performing the predictive error analysis of the blockchain error comprises:
analyzing a blockchain error using an error repository; and
detecting a match between the blockchain error and a corresponding entry within the error repository, wherein the corresponding entry comprises error resolution code, wherein performing automatic error correction of the process flow comprises executing the error resolution code.

12. The computer program product of claim 8, wherein performing the predictive error analysis of the blockchain error comprises:
detecting an error component from the blockchain error via a text analysis algorithm; and
based on detecting the error component, determining a set of solution rules, wherein performing automatic error correction of the process flow comprises executing the set of solution rules.

13. The computer program product of claim 8, wherein performing the predictive error analysis of the blockchain error comprises:
detecting an error component from the blockchain error via a machine learning algorithm; and
based on detecting the error component, determining a set of solution rules, wherein performing automatic error correction of the process flow comprises executing the set of solution rules.

14. A computer-implemented method for automatic error correction within a blockchain ledger system, the method comprising:
receiving, from the blockchain ledger system, a blockchain event log, wherein the blockchain event log comprises a blockchain error;
identifying the blockchain error from the blockchain event log;
based on identifying the blockchain error, performing predictive error analysis of the blockchain error;
based on the predictive error analysis, performing automatic error correction of a process flow of the blockchain ledger system;
performing comparative analysis between the blockchain error and the process flow of the blockchain ledger system, wherein performing comparative analysis comprises determining metrics related to: a frequency of certain error classifications, blockchain errors that require extended time to resolve, effects of an error on the blockchain process flow, and error trends; and
generating one or more error reports, the one or more error reports comprising a result of the automatic error correction of the process flow and the metrics determined by the comparative analysis.

15. The computer-implemented method of claim 14, wherein identifying the blockchain error from the blockchain event log comprises performing text analysis of the blockchain event log, wherein the text analysis comprises extracting text associated with the blockchain error from the blockchain event log.

16. The computer-implemented method of claim 14, wherein identifying the blockchain error from the blockchain event log comprises performing machine learning analysis of the blockchain event log via a deep neural network algorithm.

17. The computer-implemented method of claim 14, wherein performing the predictive error analysis of the blockchain error comprises:
analyzing a blockchain error using an error repository; and
detecting a match between the blockchain error and a corresponding entry within the error repository, wherein the corresponding entry comprises error resolution code, wherein performing automatic error correction of the process flow comprises executing the error resolution code.

18. The computer-implemented method of claim 14, wherein performing the predictive error analysis of the blockchain error comprises:
detecting an error component from the blockchain error via a text analysis algorithm; and
based on detecting the error component, determining a set of solution rules, wherein performing automatic error correction of the process flow comprises executing the set of solution rules.

\* \* \* \* \*